United States Patent [19]

Druffel

[11] 4,399,497

[45] Aug. 16, 1983

[54] RETAINER FOR A LAMP

[75] Inventor: James B. Druffel, Oakland, Calif.

[73] Assignee: Prescolite, San Leandro, Calif.

[21] Appl. No.: 217,136

[22] Filed: Dec. 16, 1980

[51] Int. Cl.$^3$ .............................................. B60Q 3/04

[52] U.S. Cl. .................................... 362/362; 362/368; 362/408; 362/396; 362/417; 362/444; 362/365

[58] Field of Search ................................ 362/147-150, 362/365, 368, 404, 408, 417, 444, 445, 362, 396

[56] References Cited

U.S. PATENT DOCUMENTS

| | | | |
|---|---|---|---|
| 2,040,117 | 5/1936 | Wilson | 362/444 |
| 2,673,927 | 3/1954 | De Sherbinin | 362/444 |
| 2,822,462 | 2/1958 | Price | 362/444 |
| 3,012,135 | 12/1961 | Kurtzon | 362/365 |
| 3,352,071 | 11/1967 | Sutter | 362/150 X |
| 3,816,880 | 6/1974 | Jacobs | 362/150 |
| 4,250,540 | 2/1981 | Kristofek | 362/368 |
| 4,358,635 | 11/1982 | Druffel | 362/365 X |

*Primary Examiner*—Peter A. Nelson

[57] ABSTRACT

A retainer for supporting a lamp socket to a housing which includes a base having an opening to permit the passage of light from the lamp. Also included is a bracket having an opening for circumscribing a leg protruding from the base. A fastener holds the leg protruding from the base within the opening in the bracket. A support holds the leg and fastened bracket to the housing.

9 Claims, 6 Drawing Figures

RETAINER FOR A LAMP

BACKGROUND OF THE INVENTION

The present invention relates to a novel and useful retainer particularly useful in supporting a lamp socket in a recessed lighting fixture.

Recessed lighting fixtures have proven to be a versatile and practical method of lighting spaces. It is also very simple to change the type of lighting effect by changing the trim, i.e. baffle, reflector, and the like, as desired. Recessed lighting suffers from several disadvantages in that the prior devices employed to locate the lamp within recessed fixtures are relatively difficult to mount in a geometrically correct position. A lamp mounted too high in the ceiling results in heat buildup problems which can become a fire hazard. Also, improper positioning of a lamp within a recessed fixture will negate the sought after lighting effect. Further, lamps which are mounted too low in a ceiling protrude from the same and may be considered an aesthetic eyesore.

A recessed lighting fixture with interchangeable trims which is easily correctly mounted adjacent a surface such as a ceiling, would be an advance in the lighting field.

SUMMARY OF THE INVENTION

In accordance with the present invention a novel and useful retainer for supporting a lamp socket to a housing, which is particularly useful with recessed fixtures, is provided.

The retainer of the present invention may simply take the form of a clip member which holds a first element to a second element. Such a clip member includes a pair of appendages each having a proximal and distal end portion. A spring is connected to the pair of appendages at the proximal end portions such that the distal end portions of the appendages are urged away from each other. Such a spring may be a coiled spring having greater than one turn and the means for holding the spring includes a flange connected to the first element which wedges between one turn and at least a portion of another turn of the spring. The second element may include a pair of ears for engaging and confining the pair of appendages. Such pair of ears may form an open slot on the surface of the second element.

In addition, the present invention may include providing the first element or base with an opening for the passage of light from the lamp being supported within the recessed fixture housing. Such a base may have at least one leg protruding therefrom. The device may also include means intended for fastening the leg of the base to the housing. Such means may take the form of the clip member hereinbefore described. The lamp socket may be fastened to a bracket or other member and supported directly on the base. The base may provide a surface for bearing the bracket against the pull of gravity.

In certain cases the bracket supporting the lamp socket may take the form a yoke or a member having at least one opening therethrough. In such a case the leg of the base projects through the opening in the bracket and the clip member would form means for fastening the at least one leg of the base to the bracket such that the leg remains through the projecting opening in the bracket.

The clip member may further take the form such that it has an opening therethrough for the passage of the leg of the base. At least one flap resiliently connected to the clip member at the edge of the opening through the clip member bites into the leg and prevents removal of the same from the opening through the clip member. In certain cases the clip member may include a pair of flaps resiliently connected about the opening through the clip member.

It may be apparent that a novel and useful retainer for supporting a lamp socket has been described.

It is therefore an object of the present invention to provide a retainer for supporting a lamp socket which easily and correctly mounts a lamp within a recessed lighting fixture.

It is another object of the present invention to provide a retainer for supporting a great variety of sockets which is inexpensive and simple to manufacture.

It is another object of the present invention to provide a retainer for supporting a lamp socket which minimizes the danger of fire by spacing the lamp a proper distance from the upper portion of the recessed lighting fixture housing.

It is yet another object of the present invention to provide a clip member for holding a first element to a second element which uses a spring action to insure proper alignment of the lamp.

The invention possesses other objects and advantages especially as concerns particular characteristics and features thereof, which will become apparent as the specification continues.

Figure 1:
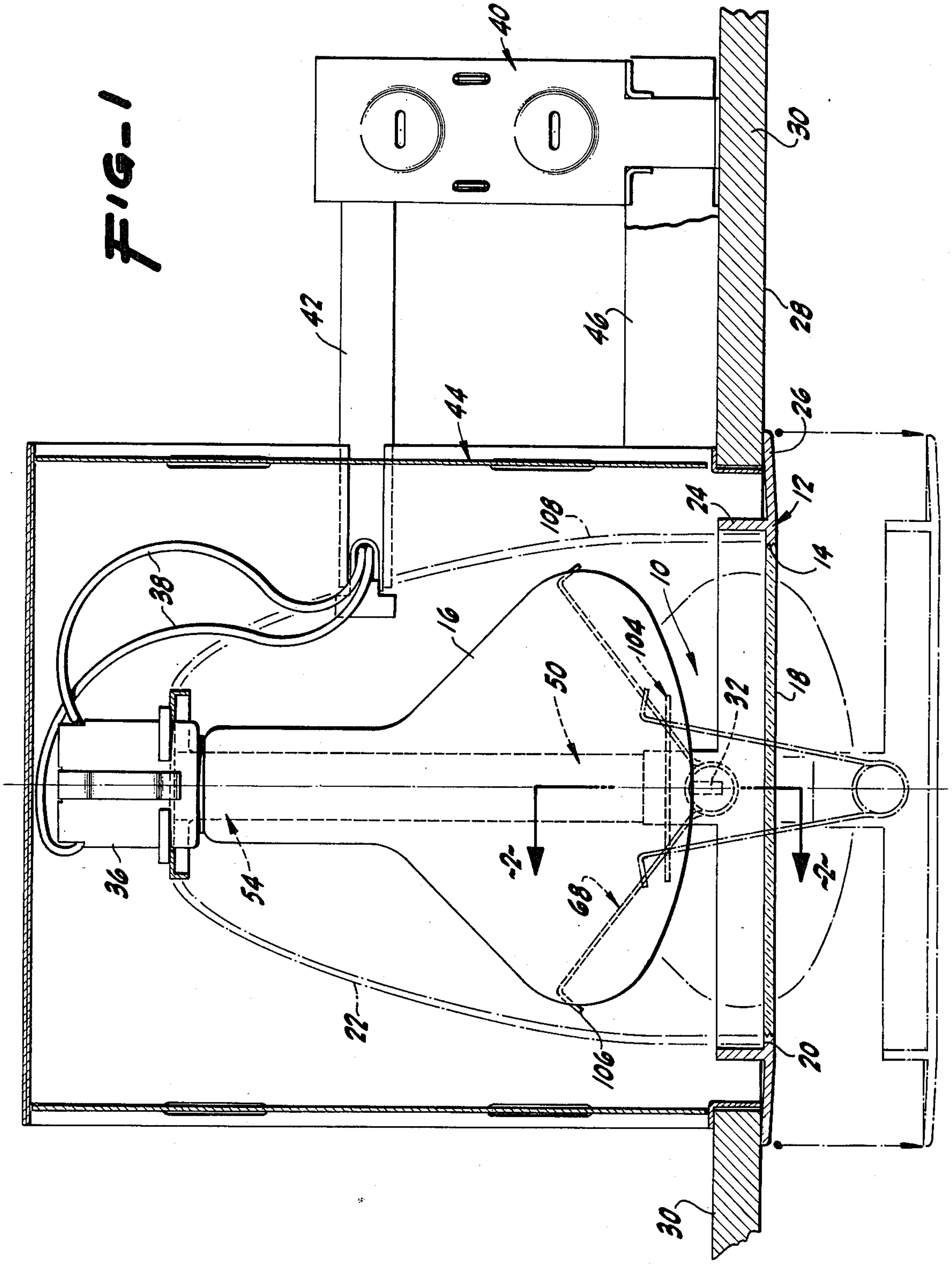
FIG. 1 is a sectional view of the retainer mechanism showing the recessed lighting lamp in elevation and including a phantom representation of movement of the base portion of the retainer.

For a better understanding of the invention reference is made to the following detailed description which should be referenced to the hereinabove described drawings.

DESCRIPTION OF THE PREFERRED EMBODIMENTS

Various aspects of the present invention will evolve from the following detailed description of the preferred embodiments thereof, which should be taken in conjunction with the hereinabove described drawings.

The invention as a whole is represented in the drawings by reference character 10. The retainer 10 includes as one of its elements, a base or trim carrier 12, FIGS. 1 and 2. Base 12 has an opening 14 for permitting the passage of light from lamp 16. A lens member 18 may be threaded into the edge of opening 14 for easy removal should lamp 16 need to be replaced. Base 12 includes a surface 20 for the support of trim 22 in one embodiment of the invention. Trim 22 is shown in phantom in FIGS. 1 and 2 for this purpose. Clips or spacers (not shown), may be used between trim 22 and base 12 to prevent movement therebetween. Recessed lighting fixtures are versatile in that a great variety of trims may be employed, i.e. adjustable, open, baffle, reflector, wallwash, and like trims. Base 12 also includes a partition 24 which circumvents opening 14. Dished flange 26 extends to the outer periphery of base 12 and is intended for making point contact with the surface 28 of member 30, e.g. ceiling, wall, etc.; lamp 16 being recessed in relation to surface 28 of member 30. Base 12 includes a pair of legs 32 and 34 which are fixedly attached or integrally formed with partition 24. Legs 32 and 34 protrude from base 12 outwardly in relation to opening 14. Likewise, stops 33 and 35 form channels 37 and 39 therebetween.

With reference to FIG. 1, it may be seen that lamp 16 fixes into electrical socket 36 of conventional configuration. Electrical wires 38 feed electrical current from a power source (not shown), which supplies electrical box 40. Wireway 42 encloses electrical wires 38 between electrical box 40 and socket 36. Electrical box 40 is connected structurally to housing 44 via support bracket means 46. Housing 44 may be constructed of any rigid material which meets electrical standards such as metal.

Retainer 10 also includes as one of its elements means 48 for fastening legs 32 and 34 to housing 44. In certain cases, a bracket 50, shown in FIG. 1 in phantom as a yoke, may be necessary to support trim 22. In such instances, means 48 may also be considered means for supporting at least leg 32 and fastened bracket 50 to housing 44. Moreover, retainer 10 may also include means 52 for fastening leg 32 and/or 34 to bracket 50 when the latter is being used in the recessed lighting fixture shown in the drawings. Bracket or yoke 50 includes a proximal portion 54 intended for holding lamp socket 36 and a distal portion 56 which terminates in the vicinity of legs 32 and 34. Distal portion 56 of yoke 50 includes at least one opening 58 therethrough. Legs 32 and 34 and stops 35 and 37 may extend through opening 58, best illustrated in FIGS. 2 and 6.

Means 48 for fastening legs 32 and 34 to housing 44 and means 52 for fastening legs 32 and 34 to bracket 50 may take the form of a clip member 60 having a spring member 62 associated therewith. Clip member 60 includes an opening 64, FIG. 6, which permits the passage of legs 32 and/or 34. A portion of clip members 60 and 66 fits within channel 37 or 39. It should be noted that clip member 60 and spring member 62 illustrated in FIG. 6 in relation to leg 32 is identical to clip member 66 and spring member 68 shown in FIG. 3 relative to leg 34. It is intended that clip members 60 and 66 and spring members 62 and 68 be interchangeable. Therefore, in describing either clip member 60, 66, or spring member 62, 68, the structural components of the same are applicable to the other interchangeable component. For example, clip member 60 includes flaps 70 and 72 which are resiliently connected to clip member 60 at the periphery of opening 62. Flaps 70 and 72 are biased away from leg 32 which permits clip member 60 to slip over leg 32 and to prevent reversal of the same. In addition, clip members 60 and 66 possess tabs 71 and 79, FIGS. 3, 5, and 6, which fits into notches 73, 75, 77, and one not visible on bracket 50.

Figures 2, 3, 4, 5, 6:
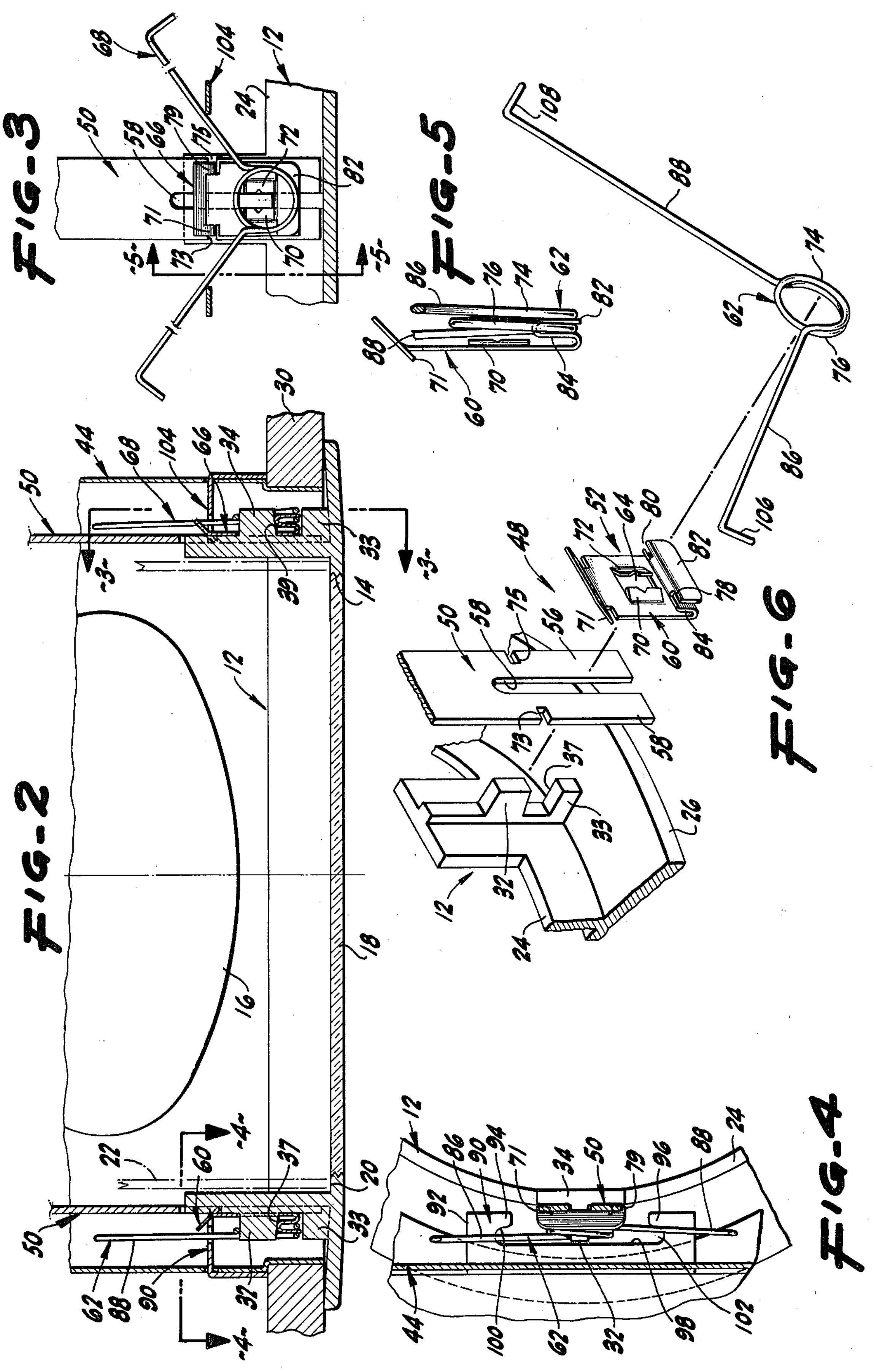
FIG. 2 is a sectional view taken along line 2—2 of FIG. 1.
FIG. 3 is a sectional view taken along line 3—3 of FIG. 2.
FIG. 4 is a sectional view taken along line 4—4 of FIG. 2.
FIG. 5 is a sectional view taken along line 5—5 of FIG. 3.
FIG. 6 is an exploded view showing the assembly of the clip member and bracket and base elements of the present invention.

Spring member 62 takes the form a a coiled spring having a first turn 74 and at least a portion of a second turn 76. Clip member 60 includes a pair of slots 78 and 80 between flange 82 and connected tongue 84, which is integrally formed with clip 60. With reference to FIG. 5, it may be seen that flange 82 wedges between first and second turn 74 and 76 of spring member 62.

Spring member 62 may be further viewed as means 48 for fastening leg 32 and connected bracket 50 to housing 44 by the use of a pair of appendages 86 and 88. Appendage 86 extends from first turn 74 of spring member 62 while appendage 88 extends from second turn 76 of spring member 62. The action of first and second turns of spring member 62 serve as means for resiliently forcing appendages 86 and 88 away from each other.

Turning to FIGS. 3 and 4, it may be seen that housing 44 provides means 90 for supporting appendages 86 and 88. Means 90 may take the form of a plate 92 having a pair of ears 94 and 96. A slot 99 is formed between ears 94 and 96 such that appendages 86 and 88 are held within notches 100 and 102 of slot 98. With reference to FIG. 3, it may be seen that plate 104, identical to plate 92, holds spring member 68 as plate 92 holds spring member 62. Plate 92 and plate 104 are fastened to housing 44 on opposite sides thereof, FIG. 2. Spring member 62 and 68 may be constructed of spring steel or any other resilient type material while plates 90 and 104 may be fashioned from any relatively rigid material which meets electrical standards, such as metal, and the like.

In operation, clip member 60 and 66 are assembled with spring members 62 and 68 such that they are placed within slot 78 of clip member 60 and a similar slot on clip member 66. Clip member 60 and 66 are then placed on legs 32 and 34, respectively. The lower portion of spring members 62 and 68 fit within channels 37 and 39. Stops 33 and 35 prevent spring members 62 and 68 from moving downwardly and separating from clip members 60 and 66. Also, leg 32 would be held to clip member 60 by the use of flaps 70 and 72 on either side of opening 64 against removal forces acting away from the center of base 12. At this point, the partially assembled base may be used in conjunction with trim 22 or yoke 50. If the former is employed, trim 22 is then placed on surface 20 of base 12. If yoke 50 is employed, slot 58 and another slot (not shown), are slipped over legs 32 and 34 between base partition 24 and clip members 60 and 66 and attached spring members 62 and 68. At this point, retainer 10 would resemble the phantom rendition shown in FIG. 1, wherein appendages 86 and 88 of spring member 62 and the appendages of spring member 68 are placed within plates 92 and 104 of fixed housing 44. Spring member 62 is slipped into slot 98 by squeezing appendages 86 and 88 together. The same is true for spring member 68 in relation to plate 104. It should be noted that the bent end portions 106 and 108 of spring member 62 and the bent end portions of spring member 62 prevent base 12 from falling freely beyond the length of appendages 86 and 88 of spring member 62 and the appendages of spring member 66. At this point, socket 36 would be attached to yoke 50 or trim 22, as the case may be. Subsequently, base 12 is gently pushed upwardly such that the spreading action of the appendages of spring member 62 and 68 pull and/or retain base 12 in a position such that flange 26 bears against surface 28 of member 30. Lens 18 is then attached to base 12. It is anticipated that removal of retainer 10 is only necessary if trim 22 is to be changed or other electrical maintenance or service work is to be performed within housing 44. Access to lamp 16 may be gained by simply removing lens 18 from base 12.

While in the foregoing specification embodiments of the present invention have been set forth in considerable detail for the purpose of making a complete disclosure of the invention, it may be apparent to those of ordinary skill in the art that numerous changes may be made without departing from the spirit and principals of the invention.

I claim:

1. A retainer for supporting a lamp socket to a housing comprising:

a. a base having an opening intended for passage of light from the lamp;

b. a bracket having a proximal portion including means intended for holding the lamp socket, and a distal portion;

c. means for fastening said base to said distal portion of said bracket;

d. means for supporting said base and fastened bracket to the housing including a pair of appendages; means for attaching said pair of appendages to said base and fastened bracket; means for resiliently forcing said, appendages away from each other; and means for supporting said pair of appendages to the housing.

2. The retainer of claim 1 in which said means for fastening said base to said bracket includes said base having at least one protruding leg; said distal portion of said bracket including at least one opening therethrough; said at least one leg being capable of projecting through said opening in said distal portion of said bracket; and in which further includes means for fastening said at least one leg to said bracket with said leg projecting through said opening, including a clip member having an opening therethrough for passage of said at least one leg of said base; and at least one flap resiliently connected to said clip member at the edge of said opening through said clip member.

3. The retainer of claim 2 in which said distal portion of said bracket includes a notch and said clip member further includes a tab which is engageable in said notch.

4. The clip member of claim 8 in which said spring is a coil spring having greater than one turn and said means for holding said spring comprises flange means connected to the first element for wedging between one turn and at least a portion of another turn of said spring.

5. The retainer of claim 3 in which said means for resiliently forcing said appendages away from each other comprises a spring connected to each appendage.

6. The retainer of claim 4 which additionally comprises a stop adjacent said leg of said base, said stop being spaced from said leg to form a channel therebetween for guiding a portion of said clip member.

7. The retainer of claim 4 in which said means for holding said pair of appendages associated with said clip member comprises providing said clip member with a slot for holding said spring.

8. The retainer of claim 1 in which said distal portion of said bracket includes a pair of limbs each having an opening therethrough; said base includes a pair of legs protruding therefrom, and further including means for fastening each of said legs to one of said limbs respectively.

9. The retainer of claim 2 in which said clip member includes a pair of flaps resiliently connected to said clip member at the edge of said opening in said clip member.

* * * * *